(No Model.)
J. SEITZ.
STUMP EXTRACTOR.
No. 301,286.  Patented July 1, 1884.
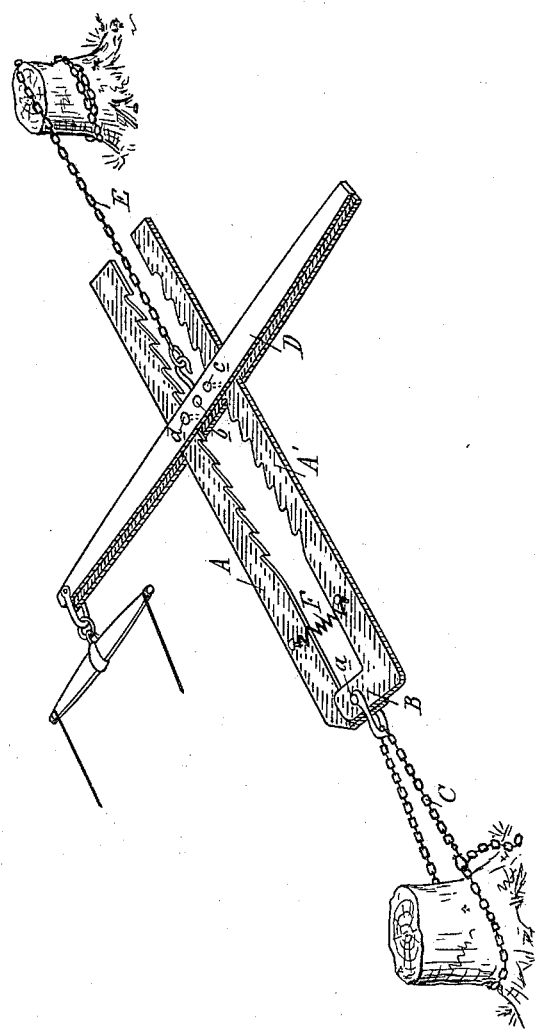
Attest
J. Paul Mayer
E. Scully.
Inventor
Jacob Seitz
By Thos. S. Sprague, Atty

UNITED STATES PATENT OFFICE.

JACOB SEITZ, OF DUNDEE, MICHIGAN.

STUMP-EXTRACTOR.

SPECIFICATION forming part of Letters Patent No. 301,286, dated July 1, 1884.

Application filed March 31, 1884. (No model.)

*To all whom it may concern:*

Be it known that I, JACOB SEITZ, of Dundee, in the county of Monroe and State of Michigan, have invented new and useful Improvements in Stump-Extractors; and I do hereby declare that the following is a full, clear, and exact description thereof, reference being had to the accompanying drawing, which forms a part of this specification.

This invention relates to certain new and useful improvements in the manufacture and operation of stump-pulling machines, by means of which great power is obtained with a minimum of expense.

My improved device is designed to be so constructed as to work horizontally, and is so applied to its work that it turns the stump out of the ground sidewise, so to speak, and makes the projecting part of the stump above ground one of the combinations of leverage for its own extraction.

In the accompanying drawing, which forms a part of this specification, my invention is shown in perspective and in operation.

A A' represent two rack-bars, the rack-teeth whereof are formed on the inner and adjacent sides of the bars. These bars each terminate in an L-shaped head, B, and these two heads are pivotally connected together by means of the bolt $a$. To the heads thus pivoted together there is secured the rod or chain C. The opposite ends of these rack-bars are free, or not connected together.

D is a lever, preferably formed of two metallic bars of equal size and length, secured together by the bolts $b$, $c$, and $d$, the former being located at the center of the length of the bars, while the latter two are located one on each side of the center bolt, and at equal distances from the same. To the center bolt, or the lever at this point, is secured the rod or chain E. One or both ends of the lever is provided with appliances by means of which a horse can be attached to said lever.

F is a strong spring adapted to draw the two rack-bars together and hold them in their proper relation to each other, and still allow the lever to actuate between them, as will now be described.

In practice the device is laid upon the ground and the chain or rod C is secured to a stump, or to a stake driven into the ground. This rod or chain is secured as near the ground as possible. The rod or chain E is then led to the stump which it is desired to extract, over its top, down the side thereof opposite the position of the device, and made fast to said stump as near the ground as is possible or convenient. At this time the lever D is located between the rack-bars, so far as its pivotal point is concerned, near their free ends. Now, a horse is hitched to one end of this lever, and is driven first in one direction and then in the other, both directions, however, being parallel to the rack-bars, compelling the bolts $c$ and $d$ to alternately engage with the teeth of the rack-bars. This movement gradually carries the lever toward the opposite ends of such rack-bars, thereby tipping the stump out of the ground toward the device. The office of the spring will readily be seen from the above description, and it will as readily be seen that the projecting end of the stump to be drawn forms a very important element in the leverage obtained therefrom. It will also be seen that the bolts $c$ $d$ not only serve to secure together the two bars of which the lever D is formed, but also serve as a means of operating the device by their engagement with the teeth of the rack-bars. Moreover, by attaching the spring F directly to the rack-bars I dispense with the pawls, which are usually required in this class of stump-pullers.

What I claim as my invention is—

The combination of the bars A A', having teeth on their inner or adjacent sides, and pivoted together at one end, the chains C and E, the lever D, provided with bolts $c$ $d$, constructed to engage with the teeth of said rack-bars, and the spring F, attached to and constructed to draw said bars A A' together to catch on the bolts $c$ $d$, substantially as and for the purpose specified.

JACOB SEITZ.

Witnesses:
E. SCULLY,
CHARLES J. HUNT.